United States Patent [19]

Rigby

[11] 3,772,769

[45] Nov. 20, 1973

[54] METHOD OF PREPARING AN ELECTRICAL COMPONENT FOR CONNECTION TO A MEMBER

[75] Inventor: Ronald William Rigby, Solihull, England

[73] Assignee: Joseph Lucas (Industries) Limited, Birmingham, England

[22] Filed: Nov. 1, 1971

[21] Appl. No.: 194,705

Related U.S. Application Data

[63] Continuation-in-part of Ser. No. 779,344, Nov. 27, 1968, abandoned.

[52] U.S. Cl. .................................... 29/574, 29/577

[51] Int. Cl. .............................................. B01j 17/00

[58] Field of Search ................... 29/574, 577, 576 S

[56] References Cited

UNITED STATES PATENTS

| | | | |
|---|---|---|---|
| 3,271,507 | 9/1966 | Elliott | 29/576 S |
| 3,435,516 | 4/1969 | Killey | 29/627 |
| 3,457,639 | 7/1969 | Weller | 29/577 |
| 3,641,661 | 2/1972 | Canning et al. | 29/574 |

*Primary Examiner*—Charles W. Lanham
*Assistant Examiner*—W. Tupman
*Attorney*—Holman & Stern

[57] ABSTRACT

A method of preparing an electrical component for connection to a member having electrical conducting portions thereon comprising providing a carrier with separate metallic ink portions thereon, connecting the carrier by electrically conducting straps to a test tile on which circuit portions are formed, the straps forming electrical connecting elements, securing the electrical component to the carrier, making electrical connections between the component and the portions on the carrier, then testing the complete assembly, and then finally removing the carrier and its component from the test tile by cutting the straps and securing it, by the straps to electrical conducting portions on the said member.

4 Claims, 7 Drawing Figures

INVENTOR
Ronald William Rigby
Holman / Stern
ATTORNEYS

INVENTOR
Ronald William Rigby

ATTORNEYS

INVENTOR
Ronald William Rigby

ATTORNEYS

METHOD OF PREPARING AN ELECTRICAL COMPONENT FOR CONNECTION TO A MEMBER

This application is a continuation-in-part of application Ser. No. 779,344 filed Nov. 27, 1968, now abandoned.

BACKGROUND OF THE INVENTION

This invention relates to methods of securing electrical components, such as multi-layer semi-conductors or other active electrical devices to members, and upon the surface of which electrical circuits are printed or otherwise formed. Such members include glass substrates inuse, enclosed within chambers containing an inert atmosphere, or alternatively ceramic tiles.

The object of the invention is to provide a method of securing electrical components to members in a convenient form.

SUMMARY OF THE INVENTION

In accordance with the present invention, a method of securing an electrical component to a member on which electrically conducting portions are formed, comprises applying a metallic ink to at least two separate portions on one surface of a ceramic carrier, applying a similar metallic ink to the underneath face of the electrical component, securing the component to one of the inked surface portions of the carrier, securing metallic straps to the separate inked surface portions of the carrier respectively, connecting one or more wires to the component to make electrical connection between it and one or more of the straps on other surface portion or portions of the carrier, and finally securing the strap ends to appropriate said conducting portions on the member.

The invention also resides in an assembled electrical component ceramic carrier, and member constructed by the method set out in the preceding paragraph.

The invention will now be described by way of example with reference to the accompanying drawings, in which:

DETAILED DESCRIPTION OF THE INVENTION

Figure 1:
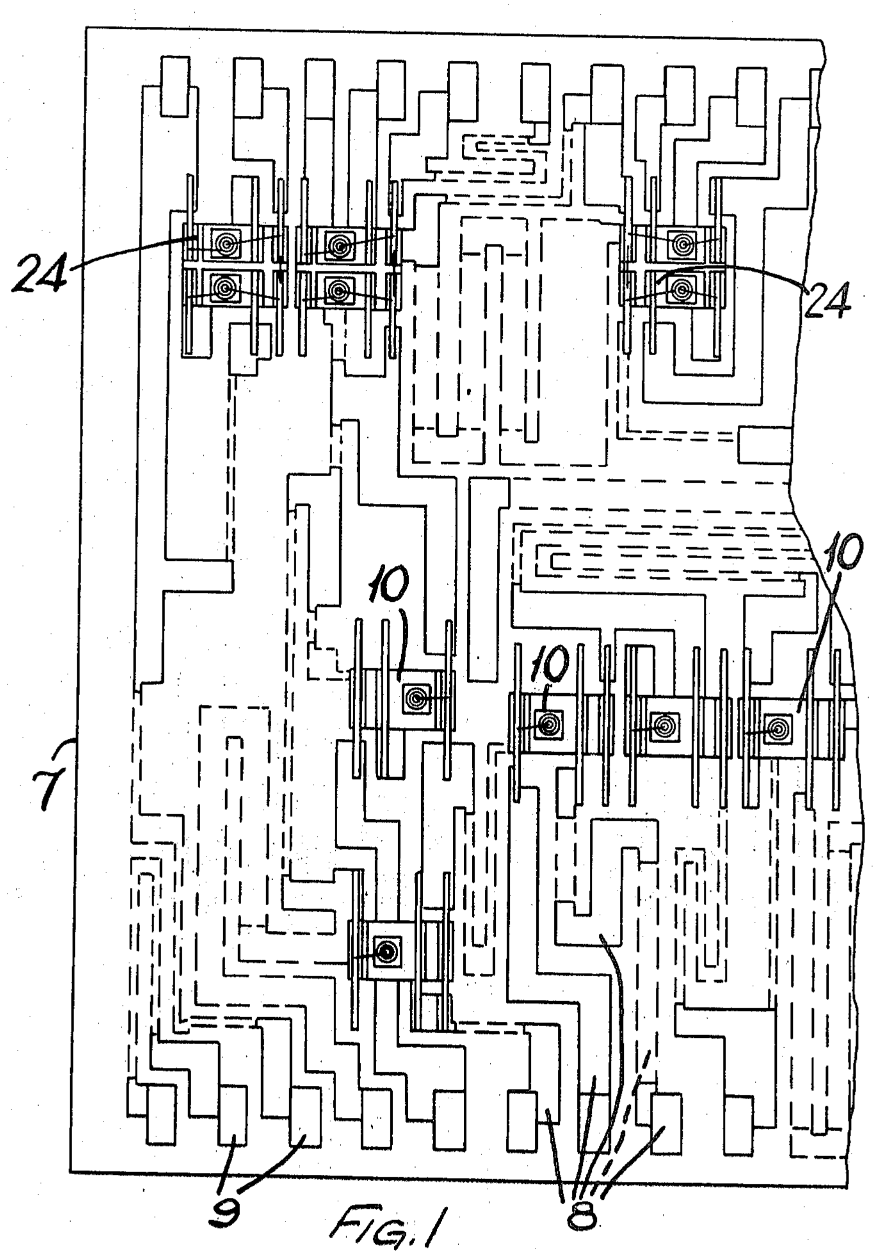
FIG. 1 illustrates, on an enlarged scale, a ceramic member having electrical circuits and which is in accordance with this invention.

Referring to FIG. 1, there is shown, in plan, a ceramic tile member 7 on which are shown a plurality of electrical conducting portions 8 which form parts of electrical circuits. These portions 8 are formed by printing metallic ink onto the surface and afterwards firing the member to cause reaction to take place between the ink and the tile to cause the ink to adhere. Some of the portions 8 are formed on one side of the member and some on the other. Along the edges of the member 7 are connector portions 9 whereby external connections can be made to the conducting portions 8 on the member 7.

Figures 4, 5, 6, 7:
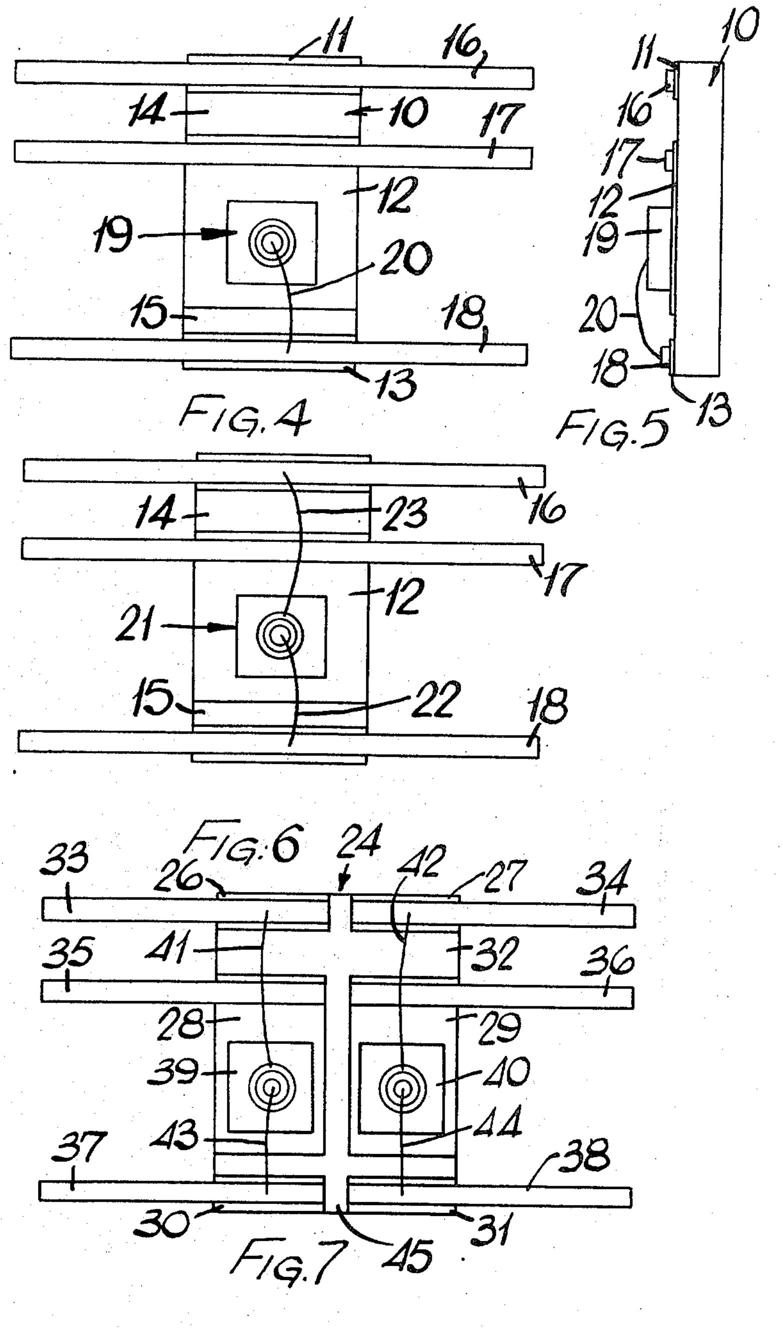
FIGS. 4 and 5 illustrate in plan and side elevation, on a much enlarged scale, a carrier for use in the invention.
FIGS. 6 and 7 illustrate in plan, alternative forms of carrier.

Secured to the member 7 on one side thereof are a number of carriers 10. Figures 4 and 5 show such carrier in one form.

The carrier 10 is formed from an electrically insulating ceramic material, one surface of which is provided with separated metallized portions 11, 12 and 13, extending in parallel bands across the surface. The non-metallized insulating portions between these bands are indicated by 14 and 15. This formation is carried out in one example by printing the whole surface, firing and subsequently etching away the unwanted portions. In another example, a vapour deposition process is used followed by etching. The process is carried out on a large piece of ceramic which is afterwards scribed and cracked into individual carriers.

Secured to the metallized portions 11, 12 and 13 are respective metal straps 16, 17 and 18. On the metallized portion 12 which is wider than the portions 11 and 13, at a position spaced from the strap 17, there is secured, by brazing or diffusion bonding, an electrical component 19, which, in this example, is a diode semiconductor. The underneath of the diode can be metallized to facilitate brazing to the portion 12 of the carrier 10.

Electrical connection to the diode is achieved through the metallized portion 12, and thence to the strap 17, and there is also connected to the top of the diode a wire 20, the other end of which is connected to the strap 18. In this example the wire 20 is formed from gold, and is connected by a thermo-compression bonding technique or welding.

The completed carrier assembly is secured to the member 7 by welding the strap ends onto the appropriate electrical portion 8, upon the member 7, the straps thus serving as electrical conductors as well as fastening elements for the carrier 10. It will be appreciated that the carrier is extremely small, and in the example shown, its overall dimensions are 0.07 inches long, 0.055 inches wide and 0.01 inches thick. However, before it is fitted onto the member 7 it is subjected to a testing procedure to ensure that it is working satisfactorily and reliably.

Figure 2:
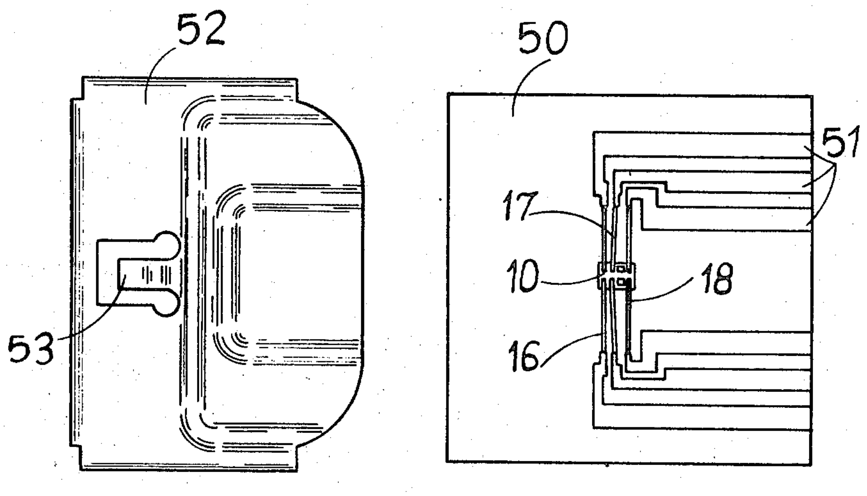
FIG.2 is a plan view of a test tile and cover for use in the invention.
Figure 3:
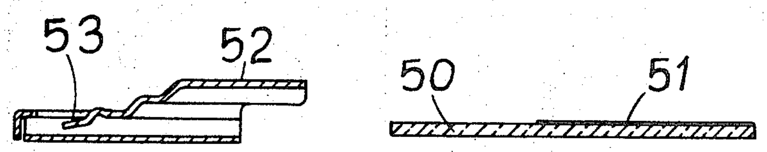
FIG. 3 is a side elevation cross-sectional view of the tile and cover of Figure 2.

The procedure for testing is carried out as follows. There is prepared a test tile 50 which is shown in FIGS. 2 and 3. It is formed from ceramic and is conveniently square. On this test tile 50 are printed portions 51 of electrical circuits divided into two groups of three. These all extend to one edge of the tile. The ends of the straps 16, 17 and 18 are connected by welding to respective one of the portions 51.

The carrier 10 is secured solely by means of these straps 16, 17 and 18 to the test tile 50 before the component 19 is secured to it. When this assembly is completed, a cover 52 is engaged over it. The cover 52 is a flanged plate having a stepped dished portion enclosing the component, carrier and the connections to the circuit portions 51, on the test tile. To retain the cover over the test tile, the cover has a resilient blade 53 which engages a surface of the tile at a point remote from any circuit portion thereon. When the cover 52 is in place, the end of the tile to which the circuit portions 51 extend is exposed, so that test equipment incorporating electrical connectors can be engaged upon it without risk of damage to the carrier, component or the connecting straps. By this means, electrical, mechanical testing and ageing under elevated and depressed temperature conditions can be conducted upon the carrier and component assembly.

In order to transfer the carrier to the member 7, after completion of testing, the straps 16, 17 and 18 are cut off near to their connections with the circuit portions 51 on the test tile, 50. These straps are, for this purpose, initially longer than is necessary for their connection to the member 7. They are then connected by welding to the appropriate portions on the member 7.

By means of this testing procedure, the carrier and component assembly is tested before being transferred to the member 7, so that risk of faults being found upon a completed or near completed member 7 is minimised. If such faults occur on a member 7, the whole member, which may be very complex, may need to be scrapped, or alternatively, the faulty parts must be changed, thus increasing the risk of damage to other parts of the member. The procedure also minimizes the testing necessary to the member 7 after its completion or during the stages of its assembly.

The cover 52 is used to protect the carrier, componentand the strap connections from damage, not only during testing, but also during transport, handling and storage. The test tile is, moreover reusable.

In the example illustrated in Figure 6 the carrier 10 carries a transistor 21 to which three electrical connections must be made. The first electrical connection is made through the base of the transistor 21 to the metallized portion 12 of the carrier, and the other two electrical connections are made through wires 22 and 23 connected to the straps 16 and 18 respectively.

In the example illustrated in Figure 7 a carrier 24 has six separate metallized band identified by numerals 26 to 31 respectively, separated by a double cross shaped unmetallized and therefore electrically insulating portion 32 on the carrier.

The metallized portions 26 to 31 have secured to them respective straps 33 to 38 with the portions 28, 29 also carrying respective transistors 39, 40 at positions spaced from the straps 35 and 36 respectively.

These transistors 39, 40 are connected through their underneath surfaces with the portions 28, 29 respectively and there are connecting wires 41 to 44 connecting the transistors to the straps 33, 34 and 37, 38 respectively.

The straps 37, 38 are connected together by means of a bridging wire 45, but in an alternative constrction, the straps 37, 38 are combined to form a single strap.

Further constructions are within the scope of the present invention, in which single or combinations of electrical components such as semi conductor or other electrical devices, are secured to a carrier at separated electrically conducting metallized portions of the surface of the carrier.

The invention is also applicable for securing components onto substrates of various other materials on which electrical circuits are formed by vacuum deposition.

I claim:

1. Method of preparing an electrical component for connection to a member on which electrically conducting portions are formed, comprises providing a ceramic carrier, applying a metallic ink layer to at least two separate portions on one surface of the carrier, connecting the carrier by metallic electrically conducting straps to a test tile on which circuit portions are formed, the straps being connected to these circuit portions respectively, securing theelectrical component to one of the inked surface portions of the carrier, connecting at least one wire to make electrical connection between the component and another one of said separate portions of the carrier, testing the carrier and component on the test tile, removing the tested carrier and component from the test tile by cutting the straps, and finally securing the carrier onto said member and also making electrical connection with the electrical conducting portions on the member by securing the strap ends to appropriate ones of said conducting portions on the member.

2. A method as claimed in claim 1 in which the said wire is connected by a thermo-compression bonding technique.

3. A method as claimed in claim 1 in which the whole of said one surface of the carrier has the metallic ink applied to it and separate portions are formed by etching parts of the ink away from appropriate areas.

4. A method as claimed in claim 1 in which the test tile is provided with a cover which encloses the carrier, component and the strap connections.

* * * * *